United States Patent
Maisotsenko et al.

(10) Patent No.: US 6,854,278 B2
(45) Date of Patent: Feb. 15, 2005

(54) METHOD OF EVAPORATIVE COOLING OF A FLUID AND APPARATUS THEREFOR

(76) Inventors: Valeriy Maisotsenko, 5628 S. Idalia St., Aurora, CO (US) 80015; Leland E. Gillan, 3124 W. 62nd Ave., Denver, CO (US) 80221; Timothy L. Heaton, 10875 W. 77th Ave., Arvada, CO (US) 80005; Alan D. Gillan, 3556 W. 62nd Ave., Denver, CO (US) 80221

(*) Notice: Subject to any disclaimer, the term of this patent is extended or adjusted under 35 U.S.C. 154(b) by 0 days.

(21) Appl. No.: 10/223,223

(22) Filed: Aug. 19, 2002

(65) Prior Publication Data

US 2003/0033821 A1 Feb. 20, 2003

Related U.S. Application Data

(60) Provisional application No. 60/313,906, filed on Aug. 20, 2001.

(51) Int. Cl.[7] .................. F25D 17/06; F25D 23/12; F25C 1/00
(52) U.S. Cl. .................. 62/94; 62/315; 62/259.4
(58) Field of Search .................. 62/285, 121, 271, 62/172, 310, 94

(56) References Cited

U.S. PATENT DOCUMENTS

| | | | | |
|---|---|---|---|---|
| 3,659,623 A | * | 5/1972 | Facius | 137/255 |
| 3,997,635 A | * | 12/1976 | Hallgren | 261/161 |
| 4,594,860 A | | 6/1986 | Coellner et al. | |
| 5,187,946 A | * | 2/1993 | Rotenberg et al. | 62/314 |
| 5,460,004 A | * | 10/1995 | Tsimerman | 62/94 |
| 5,555,742 A | * | 9/1996 | Kelley | 62/311 |
| 5,617,913 A | | 4/1997 | DeGregoria et al. | |
| 2002/0011075 A1 | | 1/2002 | Faqih | |
| 2002/0073718 A1 | | 6/2002 | Maisotsenko et al. | |

FOREIGN PATENT DOCUMENTS

| | | |
|---|---|---|
| SU | 690271 | 11/1976 |
| SU | 641260 | 4/1977 |

* cited by examiner

*Primary Examiner*—Chen Wen Jiang

(57) ABSTRACT

The operating efficiency of indirect evaporative cooling processes and indirect evaporative cooling apparatus employing a dry side channel and a wet side channel separated by a heat exchange plate are improved by placement of holes in the heat exchange plate. Further improvements are obtained when the flow direction in the wet side channel is cross-current to the flow direction in the dry side channel. Placement of desiccant materials in the dry side channel also serve to improve the operating efficiencies of these processes and apparatus.

50 Claims, 8 Drawing Sheets

METHOD OF EVAPORATIVE COOLING OF A FLUID AND APPARATUS THEREFOR

RELATED APPLICATIONS

This patent application claims priority to U.S. Provisional Application Ser. No. 60/313,906, filed Aug. 20, 2001, and entitled "Apparatus and Method for a Dew Point Evaporative Cooling Tower".

BACKGROUND OF THE INVENTION

1. Field of the Invention

The present invention generally relates to evaporative cooling processes. It especially relates to indirect evaporative cooling processes that employ an array of heat transfer plates to create channels through which a pre-cooled gas (e.g., air) and an evaporative liquid (e.g., water) are directed in order to carry out said processes.

2. Discussion of the Background

Indirect evaporative cooling processes can be used to remove undesired heat from various industrial, commercial and domestic facilities. For example, such processes can be employed to remove undesired heat from electrical power plants, oil refineries, chemical production plants, air conditioning systems and so on. Indirect evaporative cooling processes seek to take advantage of the fact that, if the temperature of a gas (such as air) entering such a process is lowered prior to its coming into direct contact with an evaporative liquid (such as water), the lowered gas temperature will produce a lowered wet bulb temperature of that pre-cooled gas. Consequently, the temperature of an evaporative cooling liquid that comes into contact with such a relatively cooler gas stream also will be lowered. If this concept is carried to its ideal limits, the temperature of the incoming gas could be lowered to a wet bulb temperature that approaches its, relatively lower, dew point temperature.

U.S.S.R. Patents 641260 and 690271 to Maisotsenko describe evaporative cooling apparatus having a dry side channel and a wet side channel that are separated by a heat exchange plate. An air stream entering the dry side channel is pre-cooled by passing it downward along the heat exchange plate when it is in a cooled condition. This downward flowing stream of air can be cooled without raising its humidity. This air stream is then directed around the lower edge of the heat exchange plate. Thereafter, the air stream is directed upward (in a generally counter-flow direction relative to the downward flow direction of the incoming air) along the opposite, wet side of the heat exchange plate. This wet side of the heat exchange plate also serves as a wall of the wet side channel.

Meanwhile, water is directed downwardly in the wet side channel and especially along a continuously wetted side of the heat exchange plate. Some of this descending water evaporates into the pre-cooled, counter-flowing air stream as it passes upward through the wet side channel. That is to say that the evaporated water has taken up its heat of vaporization and become a component of the upwardly flowing air stream. This evaporation process cools the remainder of the descending water as well as the wet side surface of the plate. This cooled condition of the wet side surface of the plate will be transmitted through the body of the plate to its dry side. This, in turn, will cause heat to be removed from the incoming air stream that is flowing downwardly through the dry side channel. This pre-cooling of the air in the dry side channel (without raising that air's humidity) also causes the air to have a relatively lower wet bulb temperature. Ideally, this lower wet bulb temperature will approach the air's dew point temperature. Processes of the type described in the Maisotsenko patents have come to be known as "indirect evaporative cooling processes".

SUMMARY OF THE INVENTION

The indirect evaporative cooling processes of the present patent disclosure also employ indirect evaporative cooling apparatus having a dry side channel and a wet side channel that are separated by a heat exchange plate. They too are used to cool a fluid such as a gas (e.g., air) and/or a liquid (e.g., water). It might also be noted here that by use of the term "plate", applicants do not intend to limit the contour of the surface of the heat exchange plate to a flat shape. Indeed, the term plate may be taken to mean any shape including curved, spiraled, corrugated or otherwise contoured shape that meets the requirements of a particular installation. Applicants' apparatus, and the indirect evaporative cooling processes carried out by them, also serve to reduce the temperature of an incoming gas stream (e.g., a stream of air, nitrogen, carbon dioxide, industrial waste gas, etc.). The processes and apparatus of the present patent disclosure are, however, capable of producing gas temperatures that come relatively closer to the dew point temperature of the gas with far less pressure drop than produced by the previously discussed Maisotsenko processes. This all goes to say that applicants' methods use relatively lower pressure drops and produce higher operating efficiencies. These higher operating efficiencies imply lower operating costs.

Applicants' relatively lower gas and evaporative liquid temperatures are produced by passing a portion of an incoming gas stream through the body of applicants' heat exchange plate—rather than passing all of the incoming gas around the lower edge of that plate. The portion of the incoming gas passing through applicants' plate also is, to varying degrees, pre-cooled by contact with preceding portions of the cooled dry side surface of the heat exchange plate. Upon passing through the plate, this portion of the incoming gas enters the wet side channel. Therefore, the processes and apparatus of the present patent disclosure differ from those of the Maisotsenko patents in that a portion (e.g., from about 5% to 100%) of the incoming air flowing through applicants' dry side channel is forced through an array of holes, perforations, micro sieves and/or air permeable regions in the body of the heat exchange plate—and then on into the wet side channel. That is to say that the holes permit fluid communication between the dry side channel and the wet side channel. For the purposes of this patent disclosure all such holes, perforations, micro sieves, openings, areas of gas permeability, etc. in applicants' heat exchange plate will be referred to as "holes" regardless of their size, geometries, spacings, etc. The remainder of applicants' incoming gas (e.g., 95% to 0% of the original volume of incoming gas) will, most preferably, pass around the heat exchange plate (e.g., around the edge) and then also enter the wet side channel. These holes also allow better distribution of air flow than the previously discussed methods. They also give more flexibility in manufacturing and in cooling product gases and various product fluids.

The portion of gas passing through the holes in applicants' heat exchange plate and any portion of the gas that may flow around the edges of that plate will then combine in the wet side channel and generally flow along the "wet side" of the heat exchange plate. Gas flow in the wet side channel can be in a counter-flow direction such as that employed by Maisotsenko; but, in a particularly preferred embodiment of the present invention, the gas flow direction in applicants' wet side channel is, preferably, in a cross-flow direction that is substantially normal to (e.g., 90° to) the flow direction of the incoming gas stream in the dry side channel. Certain advantages and disadvantages associated with these different directions of flow will be discussed in subsequent portions of this patent disclosure.

Whatever flow directions are used, the wet side of applicants' heat exchange plate is provided with an evaporative liquid (e.g., water, coolant liquids such as gasoline, desiccant or other suitable evaporative fluids, etc. and solutions thereof). This evaporative liquid is introduced into the wet channel in a manner such that a portion of it will form a film, stream and/or droplets on a portion of the area of the wet side surface of the heat exchange plate. Under appropriate temperature, pressure and flow rate conditions, a portion of this evaporative liquid will evaporate from the wet side surface of the heat exchange plate into a portion of the pre-cooled gas stream that is then passing through the wet side channel. In so evaporating, the evaporated portion of the evaporative liquid takes up its heat of vaporization from its surroundings—and especially from the wet side surface of the heat exchange plate. This cooled condition is transmitted through the body of that plate and becomes the source of the pre-cooling of the incoming gas as it passes through the dry channel.

The evaporative liquid vapor that enters the pre-cooled gas stream passing through the wet side channel raises the humidity of the wet side channel gas stream. At the same time, the temperature of the wet side gas stream is raised by heat from both the liquid being evaporated and the heat transfer through the plate. The resulting heated, more humid gas stream is then removed from the wet side channel. Thereafter it can be disposed of as a waste product, recycled back into applicants' processes in ways hereinafter more fully described and/or directed to various external processes that may require a high temperature and/or high humidity gas such as air, e.g., air combustion turbine operations.

The evaporative liquid (e.g., water) on the wet side of applicants' heat exchange plate will naturally move downward, under the influence of gravity, along a hard smooth face surface of a solid, sheet-like heat exchange plate. In other preferred embodiments of this invention, however, the evaporative liquid will move downwardly in the body of an absorbent material that is associated with a solid, impermeable sheet-like material (such as a sheet of plastic—albeit a sheet of plastic having holes in it) to produce a two layered (e.g., laminated) plate. For example, one side of such a two layered plate can be formed from a sheet of waterproof or low permeability material such as plastic, metal, ceramic, etc. while the other layer of such a two layered plate will comprise a wettable material (such as cellulose, burlap, etc.) that can readily absorb the evaporative liquid being employed and hold said liquid in relatively prolonged contact with the wet side surface of the solid, impermeable layer of the plate.

Various evaporative liquid distribution systems can be employed to provide appropriate amounts, forms (films, droplets, etc.) and flow direction for the evaporative liquid e.g., (1) flow along an impermeable wet side surface of a plate and/or (2) flow within a system of void spaces in a porous, laminate layer of a two or more layered plate. Various tradeoffs are in play here. For example, movement of the evaporative liquid along a smooth, solid wet surface of a single solid sheet can be accomplished with less expensive plate materials and with lower operating costs. On the other hand, movement of such a liquid in an absorbent material within the body of a two layered plate implies greater plate manufacturing costs as well as greater operating costs. However, plates having an absorbent material layer require relatively less surface area. This decreased surface area may be worth the material and/or operating costs price paid for it—if work space volume considerations are especially important. Use of absorbent material layers in multi-layered heat exchange plates also will facilitate attainment of relatively lower gas temperatures and, hence, higher operating efficiencies.

The operating efficiencies of the hereindescribed processes and apparatus also can be improved by various methods of reducing the dew point temperature and thus the wet bulb temperature of the incoming air (or other gas). For example, reduced dew point temperatures can be achieved by dehumidifying an incoming stream of air with wet and/or dry desiccant materials. This dehumidification can take place before and/or after the air actually enters the dry side channel. In one particularly preferred embodiment of this invention, this dehumidifying of incoming air is accomplished through use of solid or liquid desiccant materials deployed in applicants' dry side channel.

It might also be noted here that the theoretical limitation of the hereindisclosed methods and apparatus for indirect evaporative cooling is the dew point temperature of the subject gas (e.g., air). Thus, if the incoming gas 2 is dehumidified, a lower dew point temperature can be realized. This can be done by applying a solid or liquid desiccant to the dry side surface of various sheet exchange plates. By dehumidifying the incoming air 2 during the process of pre-cooling that air, the heat of adsorption or absorption associated with the dehumidifying process is removed through the body of the heat exchange plate. This heat removal also serves to increase the efficiency of the desiccants because, in general, desiccants (wet or dry) will adsorb or absorb moisture better at lower temperatures.

The hereindescribed indirect evaporative cooling process also can be adapted to continually regenerate a solid or liquid desiccant and thereby reduce the cost of a desiccant regeneration function. In yet another preferred embodiment of this invention, the evaporative liquid employed in the wet side channel is itself a liquid desiccant. In other words, such a liquid can serve the evaporative liquid function as well as a desiccant function. In yet another preferred embodiment of this invention (and especially those employed in high humidity environments), the incoming gas and/or the incoming evaporative liquid(s) are heated before they enter applicants' indirect evaporative cooling apparatus. Heat from compressors, motors or power plant waste heat sources may be readily employed for these heating operations.

The indirect evaporative cooling processes of this patent disclosure also may be carried out by apparatus having a plurality of hole-containing heat exchange plates. Such a plurality of plates may be constructed to produce alternating counter-current and/or cross-current flows within various arrays of gas flow channels hereinafter more fully described. In some of the most preferred embodiments of this invention, those internal spaces that constitute an array of dry side channels and/or an array of wet side channels are created by use of corrugated sheets—and especially those having arrays of holes hereinafter more fully described.

DETAILED DESCRIPTION OF THE INVENTION

Figure 1:
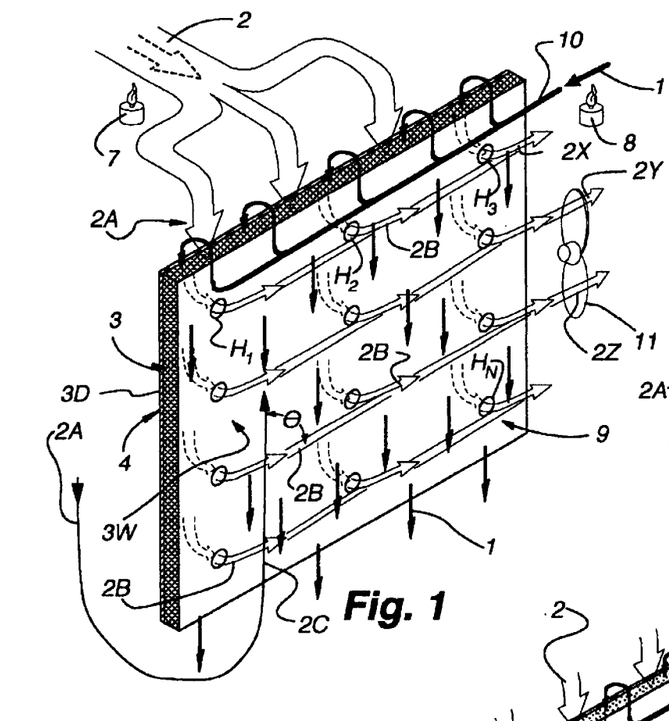
FIG. 1 is a perspective view showing a representative hole-containing heat exchange plate of this patent disclosure.

FIG. 1 is a perspective view of a representative heat exchange plate 3 used in the indirect evaporative cooling apparatus and processes of this patent disclosure. Such a plate forms a common wall between a dry channel and a wet channel of applicants' indirect evaporative cooling apparatus. As indicated previously, the term "plate", as used herein, is not intended to be limited to a flat plane. Such a plate can be shaped for a particular installation and include curved, angled, spiraled, corrugated or otherwise contoured configuration to better function as a heat transfer surface in a given application. In all cases, one side of the plate is one wall of the wet side channel and the other side is a wall of the dry side channel. Applicants' indirect evaporative cooling processes begin by passing an incoming stream of gas 2 (such as air, nitrogen, carbon dioxide, industrial waste gas, etc. and/or mixtures thereof) over a dry side, heat transfer surface 3D of the heat exchange plate 3. The opposite, wet side of this plate 3 is designated 3W. In certain embodiments of this invention, such a plate 3 is made from a single layer of a hard, smooth, waterproof or low permeability material 4 such as a sheet of plastic, metal or ceramic material.

During the course of some of the hereindescribed indirect evaporative cooling processes, the dry side 3D of plate 3 is cooled by an evaporation process that has taken place on the plate's opposite, wet side 3W. This cooled condition of the dry side surface 3D of the plate 3 can be used to reduce the temperature of the incoming gas (e.g., air) 2 (preferably, without increasing the humidity of the incoming gas). Thus, the incoming gas 2 is given a lower wet bulb temperature. Again, such a lower temperature can be utilized to great advantage in the process of evaporating a coolant liquid 1 (such as water) in applicants' wet side channel.

The heat required for the evaporation of a portion of the evaporative liquid coolant (e.g., water) into the cooled gas stream in the wet side channel is gained from heat flow across the heat exchange plate 3 (i.e., from its dry side 3D to its wet side 3W). That is to say that the heat flow across plate 3 creates a heat flux on the wet side of the plate that serves to increase the evaporation rate of the evaporative liquid into that portion of the gas stream 2 which is then passing through the wet side channel. Thus, the dry side 3D of the plate 3, and the gas stream 2 passing by the dry side 3D of the plate 3 (and through it) are cooled. This dry side channel cooling will often be referred to as "pre-cooling" for the purposes of this patent disclosure.

The temperature, pressure, relative humidity and flow speed of the gas stream 2 in the wet side channel—in conjunction with the heat passing through the heat exchange plate—will cause a portion of the evaporative liquid (e.g., water 1) to be evaporated into that portion of the gas stream 2 then passing through the wet side channel. This evaporation, in turn, causes cooling of the wet side surface 3W of the plate 3 as well as cooling of the remaining evaporative liquid that continues to flow down the wet side surface 3W of the plate 3. In other words, a portion of the evaporative liquid has taken up its heat of vaporization and passed into a vapor phase that is taken up into the gas stream 2 as it passes through the wet side channel. The temperature of the remaining evaporative liquid, in its still liquid state, is also thereby lowered. In the ideal case, the temperature of the remaining liquid at the bottom of the heat exchange plate will approach the dew point temperature of the gas (e.g., air) passing through the plate to the wet side channel. The evaporation of the evaporative (coolant) liquid 1 in applicants' wet channel also causes the gas stream 2 in the wet channel to increases in humidity. The temperature of the gas stream passing through the wet channel is also increased. The resulting warmer, more humid gas stream is then removed from the wet side channel. It can be discarded or utilized as desired.

FIG. 1 also depicts how a portion of the incoming gas stream 2 (e.g., from about 5% to about 100%, and more preferably from about 20% to about 100% thereof) passes from the dry side 3D of the plate 3 to its wet side 3W through an array of holes, perforations, micro sieves or gas-permeable portions $H_1$, $H_2$, $H_3$... $H^N$ in the otherwise impermeable plate 3. It might also be noted here that the impermeable quality of the remainder of the surface area of the plate 3 serves to reduce the overall pressure drop between a relatively higher dry side channel pressure and a relatively lower wet side channel pressure. This, in turn, reduces the energy required to operate (and the necessary size of) applicants' indirect evaporative cooling apparatus. Thus, the size and/or spacing of the holes in the plate(s) can be varied to meet various operating requirements for a given indirect evaporative cooling duty.

FIG. 1 also illustrates another preferred embodiment of this invention. It is concerned with the direction of gas flow in a wet side channel relative to the direction of gas flow in a dry side channel. For example in FIG. 1, the passage of the incoming gas stream 2 is initially directed in a generally downward direction 2A on the dry side 3D of the plate 3. After passing through the array of holes ($H_1, H_2, H_3 \ldots H_N$) in the plate 3, the resulting sub-streams (e.g., 2X, 2Y, 2Z) of the gas portion that passed through the holes ($H_1, H_2, H_3 \ldots H_N$) can then be directed through a wet side channel in a substantially horizontal, cross-flow direction 2B such as that depicted in FIG. 1. A gas moving device 11 such as a fan can be used to produce this cross-flow. Flow through the wet channel also can be directed in the generally vertically upward, direction 2C depicted in FIG. 1. This vertically upward direction 2C is in a substantially counter-flow direction (i.e., 180° opposite), relative to the vertically downward flow direction 2A of the gas stream 2 on the dry side 3D of the plate 3. Gas flow 2 through the wet side channel also could be at some angle θ that is neither vertical (a counter-flow direction approximating direction 2C) nor horizontal (a cross-flow direction approximating direction 2B). For example this angle θ could be 30°, 45°, 60°, etc.

That portion (e.g., 5% to 100% of the original air volume) that passes through holes $H_1, H_2, H_3 \ldots H_N$, then goes into direct contact with the evaporative cooling liquid 1 moving down the wet side 3W of the plate 3. After passing through the body of the plate 3, the gas can then flow in a cross-flow, counter-flow (or some combination of cross and counter-flow suggested by the angle symbol θ) direction defined by the orientation of the wet side channel walls. Here again, tradeoffs are involved. For example, use of a cross-flow direction 2B (or its direct opposite direction) in the wet channel requires less pressure drop between the dry side channel and the wet side channel.

The advantage of a counter-flow direction in the wet side channel is that it allows a lower temperature to be obtained as relatively more of the gas is drawn from near its dew point temperature (more likely resulting from a longer travel distance down the dry side, 3D). Thus, another preferred embodiment of this invention is to cause the incoming gas 2 undergoing the pre-cooling processes, to flow in the same direction (e.g., downward) as the coolant flow in the wet channel (e.g., downward). That is to say that, under these flow direction conditions, the remaining evaporative liquid is progressively cooled to progressively lower and lower temperatures as it flows further and further downward along the heat exchange plate 3. Any gas 2 flowing deeper (e.g., downward) in to the dry channel is likewise progressively cooled to lower and lower temperatures.

FIG. 1 also suggests that if the incoming gas 2 is heated by some outside heat source 7 before the gas is pre-cooled in the dry side channel (for example, by using waste, heat or solar energy), the available latent heat/cooling capacity of the indirect evaporative cooling processes and apparatus of this patent disclosure can be increased by a greater amount than the sensible heat which is added. This is especially true in high absolute humidity climates where the dew point temperature of ambient air is higher than about 60° F. to 70° F. (depending upon the elevation of the site). Above these dew point temperatures, the effect of changing absolute humidity, with changing temperature, will become even larger. It should be emphasized, however, that it is only through a process of pre-cooling the gas 2 entering the dry channel that the hereindescribed psychometric principles can be fully applied. Similar principles are applicable to the use of a warmer incoming evaporative liquid (see item 8) as such heating of an incoming evaporative liquid stream 10 will have the same effect as pre-heating the incoming gas 2. Although the heating as illustrated in FIG. 1 (e.g., by heat source 7) is positioned to heat the incoming gas 2, the particulars of the individual application or process may dictate that such heating of the gas may occur in the middle of the flow, or for only a portion of the gas.

Figure 2:
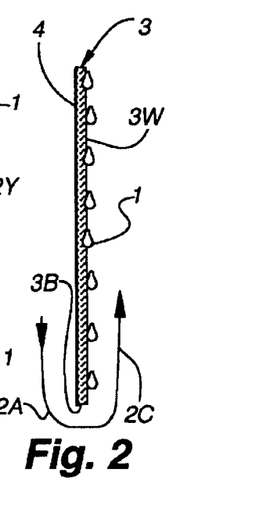
FIG. 2 is a cross sectional view of a portion of another representative heat exchange plate shown with droplets of an evaporative liquid descending along the wet side of said plate.

FIG. 2 depicts an evaporative liquid flowing, in the form of a series of droplets 1, descending along the wet side 3W of a plate 3. The plate 3 is depicted as being comprised of a single layer of an impermeable, solid material. For example, such a heat exchange plate can be made of a sheet of plastic, metal or ceramic material. Item 2A of FIG. 2 depicts how a remaining portion (e.g., 0% to 95%) of the incoming gas volume can be routed around the bottom 3B of the plate 3 and then forced to flow in a counter-flow direction 2C (relative to the incoming flow direction 2A) in a wet side channel (not otherwise shown).

Figure 3:
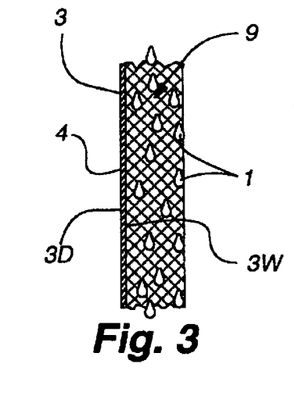
FIG. 3 is a cross-section view of a portion of a heat exchange plate of a laminate construction.

By way of contrast with the single layer plate shown in FIG. 2, FIG. 3 depicts a two layered plate 3. It has a layer of a solid, impermeable material 4 and a layer of a porous, absorbent material 9. Evaporative liquid droplets 1 are shown flowing through the body of the porous, absorbent layer material. The porous, absorbent material 9, can absorb, adsorb and/or, to some degree, hold back the evaporative liquid 1 as it flows downward along the wet side 3W of the plate 3 under the influence of gravity. Applicants have found that if the downward flow of an evaporative liquid is hindered by its passage through a porous, absorbent material 9 (e.g., burlap, cotton, metal shavings, ceramic or cellulose), in close proximity to the wet side of a solid, impermeable layer material 4 of the two layered plate 3, the evaporation rate of the coolant liquid will be significantly increased. In effect, the surface tension of the evaporative liquid (e.g., water) is reduced, and thereby allowing easier evaporation of that liquid.

Figure 4:
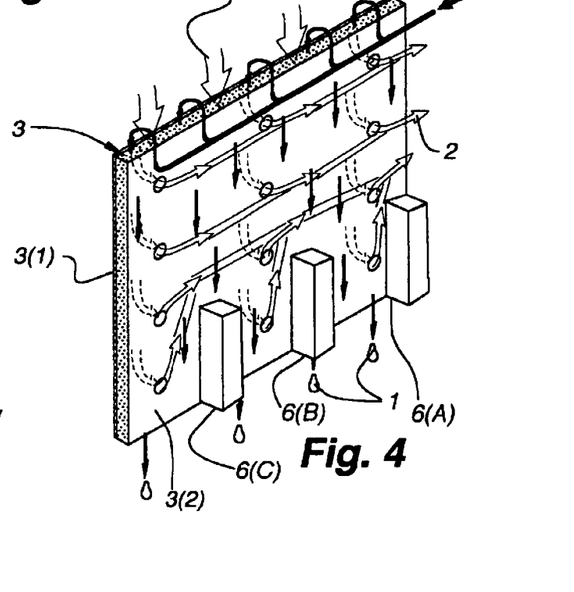
FIG. 4 is a perspective view of a hole-containing heat exchange plate that produces a gas flow path wherein an incoming gas flows in a substantially vertical downward direction along the dry side of the heat exchange plate and then flows in a rightward, substantially horizontal direction on the wet side of the plate. This plate is also shown provided with three spacer elements used in an apparatus that employs a plurality of spaced heat exchange plates.

FIG. 4 depicts a hole-containing heat exchange plate 3 having two layers 3(1) and 3(2). That is to say this plate 3 has two sub-layers i.e., a dry side impermeable layer 3(1), a wet side porous layer 3(2). The porous layer is shown being provided with an evaporative liquid 1. FIG. 4 also shows the wet side layer 3(2) provided with baffles or spacer blocks 6(A), 6(B) and 6(C). These spacer blocks are useful in constructing indirect evaporative cooling apparatus having a series of (spacer block-abutting) heat exchange plates. Such baffles or spacer blocks should not impede a cross-current flow in the wet side channel if that is the desired flow direction.

Figure 5:
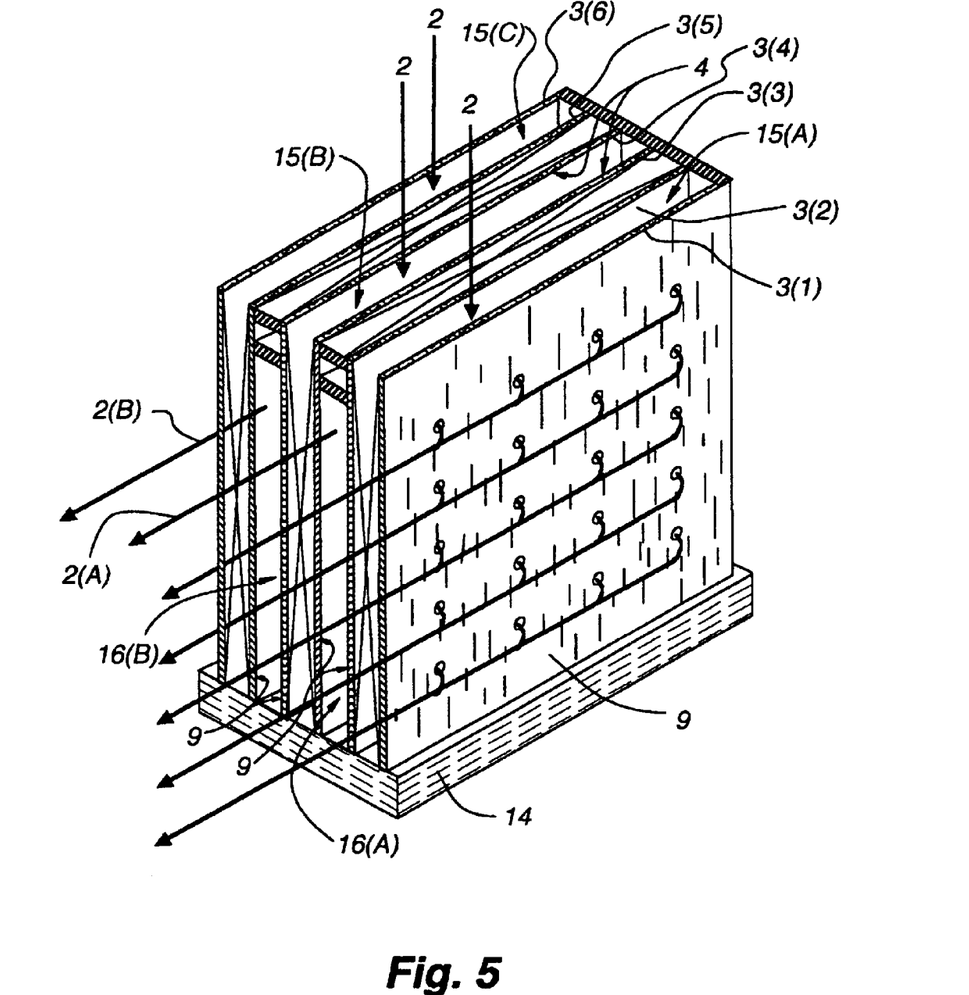
FIG. 5 is a perspective view of an indirect evaporative cooling apparatus comprised of a plurality of alternating, hole-containing, plates and channels that are attached to a common base.

Another preferred embodiment of this invention, shown in FIG. 5, is depicted as being constructed from a series of hole-containing heat exchange plates 3(1), 3(2), 3(3), etc. that are held in a spaced-apart relationship by virtue of the fact that these plates are all affixed to a common base 14. These plates are so adapted and arranged such that an alternating series of dry channels 15(A), 15(B), 15(C), etc. and an alternating series of wet channels 16(A) and 16(B) etc. are created. The common base 14 to which the plates are attached also can form a pan or reservoir (or multiple reservoirs) for a liquid coolant and/or for a liquid desiccant. Both the incoming evaporative liquid 1 and the incoming gas 2 are shown entering this indirect evaporative cooler from its top side. The incoming gas 2 eventually leaves this apparatus in a plurality of horizontally directed sub-streams 2(A), 2(B), etc. that are shown respectively exiting the wet channels 16(A) and 16(B) formed by spaced-apart heat exchange plates 3(2), 3(3) and 3(4), 3(5). An outlet for the evaporative liquid 1 can be a drain pipe (not shown) from the pan(s) or other liquid reservoir(s) in the base 14 of this apparatus. Some of the plates of FIG. 5 can be two layered in nature. For example, one side of plates 3(3) and 3(4) could be made of a solid, impermeable material (plastic materials are especially well suited for this purpose) while the other side of these plates can be provided with an evaporative liquid—wettable, absorbent material 9 (e.g., burlap). Layers of such absorbent materials are preferably laminated or otherwise attached to the solid, impermeable plate material.

Figure 6:
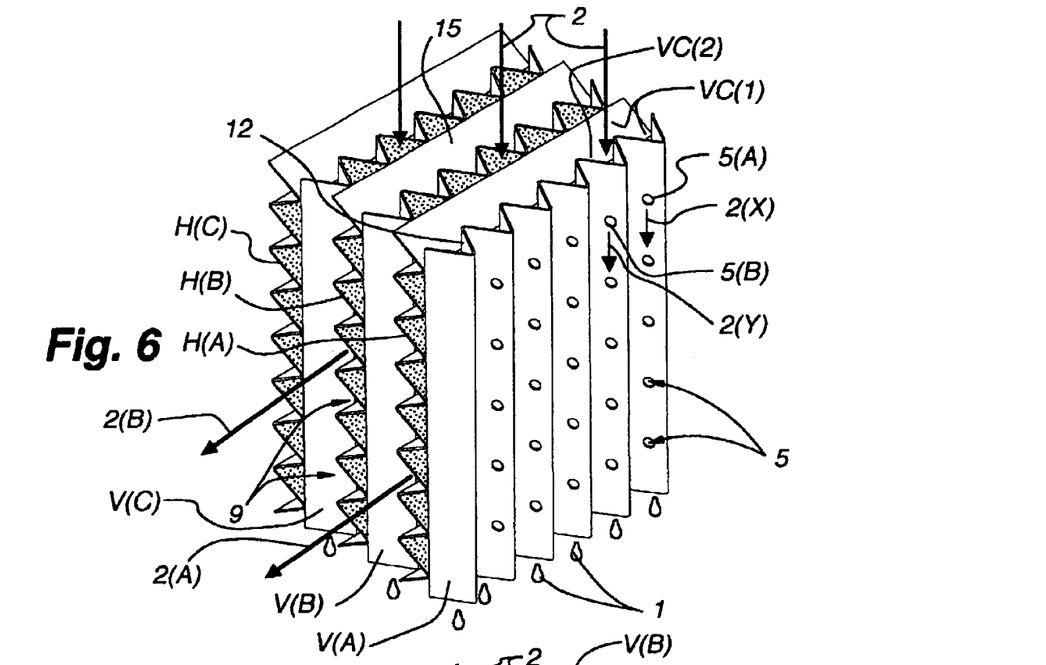
FIG. 6 is a perspective view of an array of corrugated plates in alternating, perpendicular orientations.

FIG. 6 depicts a particularly preferred embodiment of this invention wherein the heat exchange plates are horizontally and vertically alternating arrays of corrugated sheets. For example, the corrugated sheets that produce vertically directed channels are designated V(A), V(B) and V(C). The downwardly directed arrows 2 depict a gas entering these vertical channels. Those corrugated sheets whose channels having a horizontal orientation are designated H(A), H(B) and H(C). Thus, the resulting array is one having a vertical series of channels, a horizontal series of channels, another vertical series of channels and so on. These two kinds of sheets are fixedly attached to each other in this "alternating" (vertical flow/horizontal flow/vertical flow, etc.) fashion. Some or all of these sheets can be provided with holes such as those holes 5 shown in vertical corrugated sheet V(A). Thus, incoming gas 2 entering vertical channel 1 VC(1) can pass through hole 5(A) and then, for example, flow in the downward direction 2(X) suggested in FIG. 6. Similarly, air entering vertical channel 2 VC(2) can pass through and exit another hole 5(B) and then flow in the downward flow direction 2Y and so on.

Figure 7:
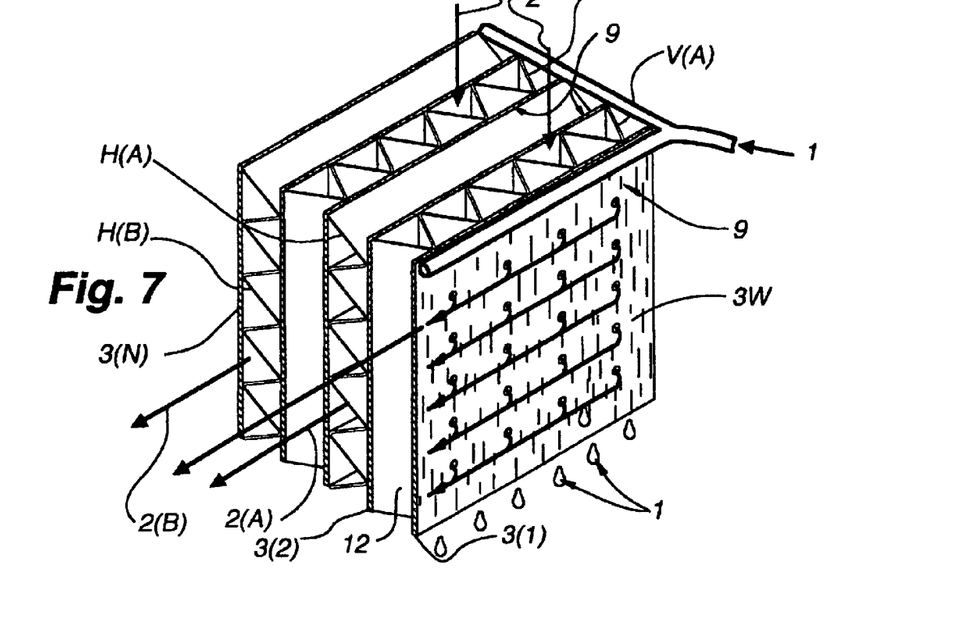
FIG. 7 is a perspective view showing an indirect evaporative cooler formed by a series of corrugated sheets separated by a series of hole-containing plates.

FIG. 7 depicts another indirect evaporative cooling apparatus made according to the teachings of this patent disclosure. It has an series of vertically directed channels (formed from an array of corrugated sheets) and an alternating series of horizontally directed channels (formed from a cross-current carrying array of corrugated sheets). These corrugated sheets are separated by hole-containing plates 3(1), 3(2) ... 3(N). By way of example only, an evaporative liquid 1 is shown running down the wet side surface of the outside plate 3(1). These plates may also be provided with solid or liquid desiccant materials and/or layers of porous, absorbent materials 9.

Figures 8, 9:
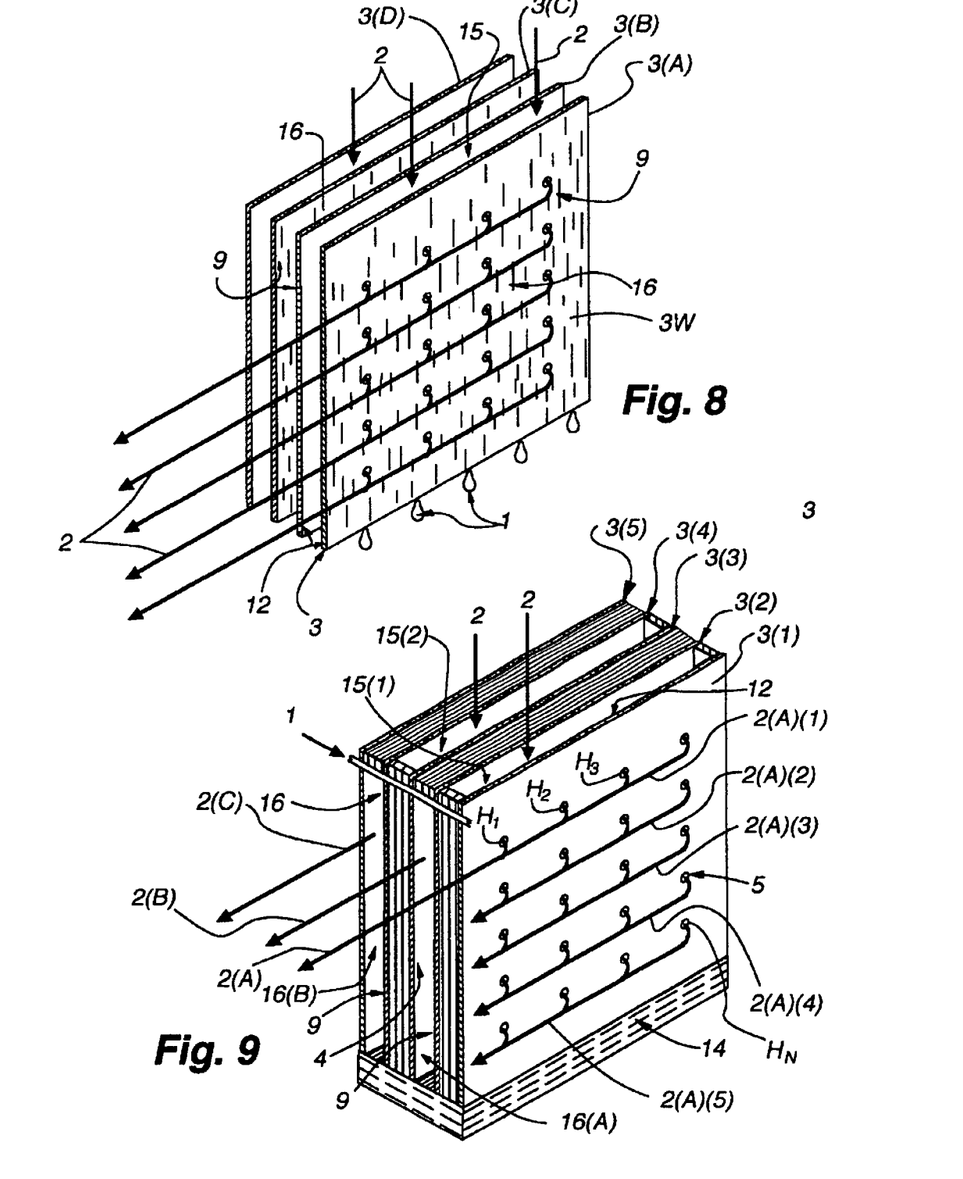
FIG. 8 is a perspective view of a plurality of hole-containing heat exchange plates having solid desiccant materials associated with them.
FIG. 9 is a perspective view of an indirect evaporative cooling apparatus having solid desiccants attached to some plates and wet desiccants flowing down others.

FIG. 8 depicts an array of plates having respective vertical and horizontal gas flow orientations. These spaced-apart, heat exchange plates 3(A), 3(B), 3(C) and 3(D) can be provided with liquids in various ways. For example, the wet side 3W of plate 3(A) is shown being provided with droplets 1 of an evaporative liquid. FIG. 8 also suggests how a porous material 9 could be placed between plate 3(B) and 3(C). This apparatus can be further modified by providing the dry surface of certain plates, e.g., the dry side of plate 3(A), with a desiccant 12. Such a desiccant can be a wet, flowing desiccant or a dry desiccant that is attached to the dry side surface of the plate. The holes could be a micro sieve or similarly selective porosity material to create a higher pressure drop across the plate and only allow certain size molecules to pass through. For example, the material could pass air but not a liquid desiccant. Thus, a lower pressure created in a wet channel will allow regeneration of a desiccant in the dry channel as the water vapor can pass through the porous plate into the wet channel.

FIG. 9 shows yet another preferred embodiment of applicants' apparatus. The vertical channels 15(1) and 15(2) are the dry channels that receive an incoming gas such as air. The horizontal channels 16(A) and 16(B) are wet channels that receive the gas that has passed through holes in the plates, e.g., holes $H_1$, $H_2$, $H_3$ ... $H_N$ in plate 3(1). FIG. 9 also suggests how a porous, absorbent material 9 can be attached to the wet side of at least one of these plates. A dry desiccant also can be attached to at least one dry side of another plate. Moreover, a plate with a porous absorbent material 9 laminated thereon can be backed up to a waterproof side of a desiccant carrying plate. These various kinds of plates can be assembled in alternate fashion. The coolant liquid 1 can be directed into the apparatus through a pipe 10 from which said coolant liquid is further distributed in troughs positioned along the upper regions of the apparatus.

Used liquid desiccant can be collected in a pan 14 and thereafter concentrated by passing said used liquid desiccant down a wet plate side of a wet channel. As a result of this, any water contained in the used (and hence, water-containing) liquid desiccant is evaporated from a liquid desiccant/water system. As more and more water is evaporated from such a liquid desiccant/water system, the liquid desiccant becomes more and more concentrated. The resulting regenerated liquid desiccant can then be sent back to the dry side channel (by devices not shown) where it is again used to dehumidify incoming gas.

Figure 10:
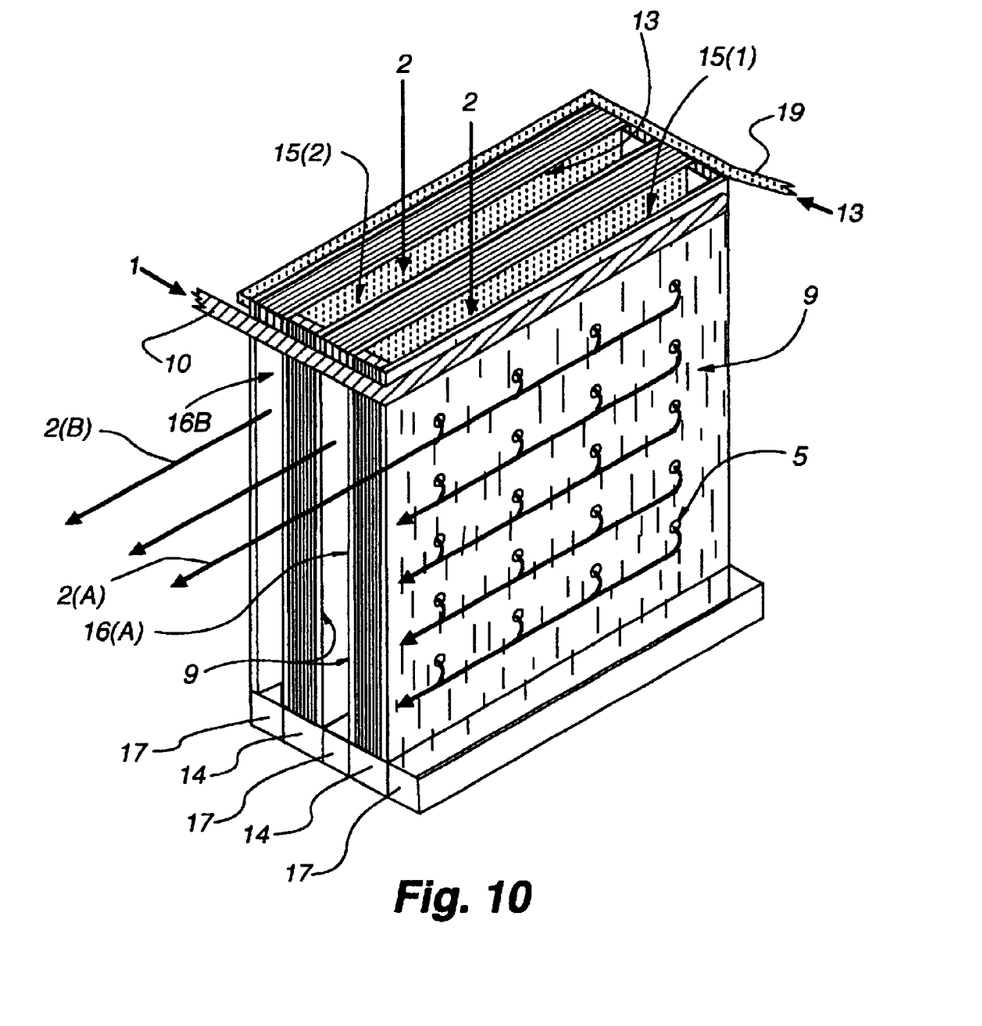
FIG. 10 is a perspective view of an indirect evaporative cooling device utilizing a liquid desiccant.

FIG. 10 shows another embodiment of the present apparatus wherein two dry channels 15(1) and 15(2) and two wet channels 16(1) and 16(2) are created by assembling a series of plates. A given plate can be further provided with a layer of absorbent material 9 on the wet channel side of any given plate. A liquid desiccant 13 is shown entering the top of the device so that it can flow (preferably as a film) along a dry side of a given plate. The liquid desiccant can be regenerated outside the device in known ways or it can be regenerated within this apparatus by replacing an incoming evaporative liquid (e.g., water) with a weak solution (e.g., one containing more water), of a liquid desiccant 13 taken from a dry side channel reservoir 14. Use of the weak liquid desiccant in place of a water coolant in the wet channel will allow evaporation of water from the liquid desiccant owing to a relatively lower pressure in the wet side channel relative to a relatively higher pressure in the dry side channel. Again, the weak liquid desiccant will become more concentrated as water is evaporated from the liquid desiccant. The resulting cooled and reconcentrated desiccant in reservoir 17 could be used as a coolant before being again used to dehumidify air entering the dry side channel 15. It might also be noted here that the cooled liquid desiccant leaving the dry channel and reservoir 14 could also be used as a process coolant liquid before it is returned to the hereindescribed process.

Figure 11:
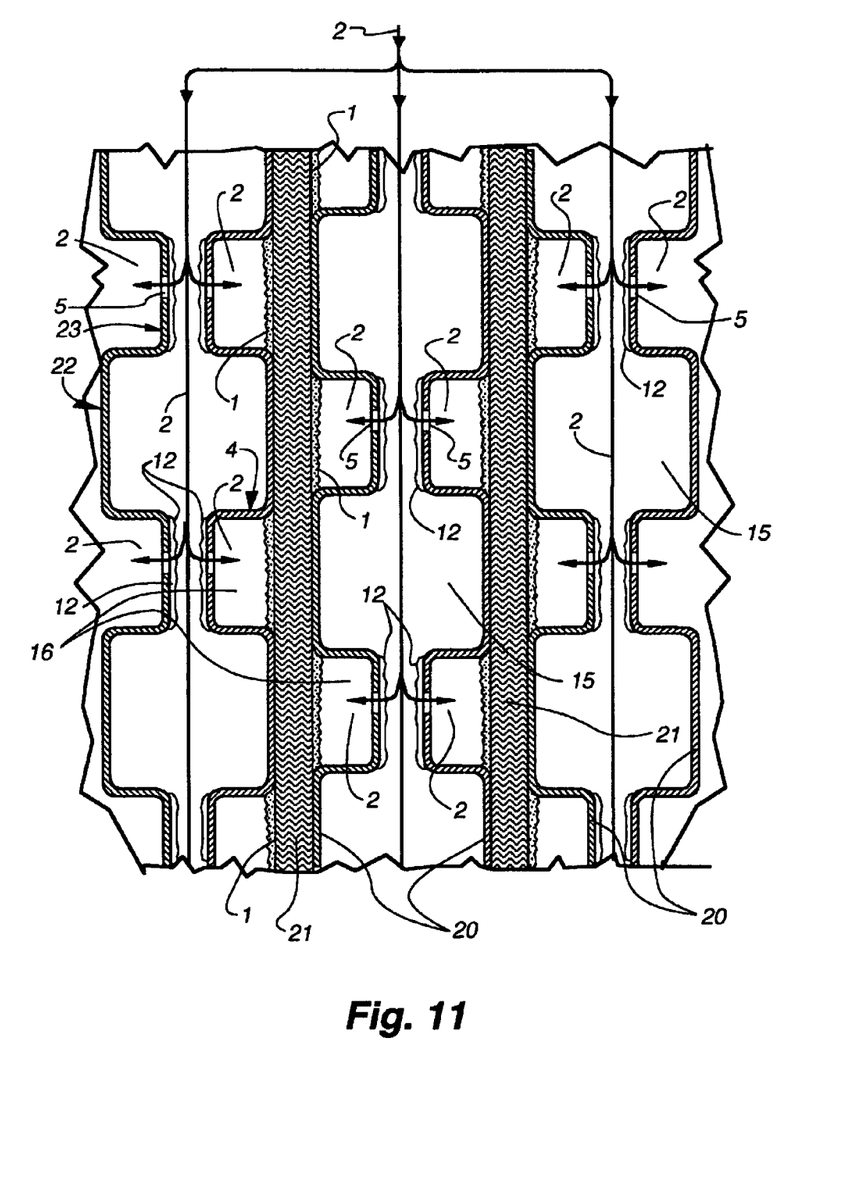
FIG. 11 is a partial cross-sectional view showing use of an array of rectangular corrugated plates with flat plates positioned between said corrugated plates.

Yet another embodiment of the present invention is shown in FIG. 11. In cross section, it shows how certain dry channels 15 and wet channels 16 can be created by use of pairs of matching, rectangular shaped, corrugated plates 20. These plates are preferably made from an impermeable material. The wet channels 16 also can contain a porous material 21 that is positioned between the corrugated plates 20. Pairs of matching rectangular corrugated plates 20 are set, in symmetrical fashion, opposite each other, to form the dry channels 15 and they, in turn, are offset to form the wet channels 16. The rectangular corrugations formed between the plates 20 are comprised of ridges 22 and valleys 23. The ridges 22 are shown to be longer than the valleys 23. The corrugations in the valleys 23 contain holes or perforations 5 which allow a gas such as air to flow between the dry channels 15 and the wet channels 16. This also allows gas flow through a wetted porous material 21 positioned between the corrugated plates 20. This corrugated configuration has the advantage of creating a relatively large surface area that allows greater heat transfer between the dry channels 15 and wet channels 16. There is also less thermal resistance for heat flux between the channels themselves. Therefore, the overall heat transfer rate is increased by this arrangement.

FIG. 11 also shows a solid desiccant film 12 applied to the inner surfaces of the dry channels 15, preferably on the outside of the valleys 23. Thus, this apparatus is capable of dehumidifying the incoming gas. It is also capable of internally regenerating the desiccant 12. For example, regeneration of the desiccant can be accomplished by a pressure drop across the dry channel 15 to the wet channel 16. It also should be noted that with this arrangement only one type of plate is needed since the valleys 23 have an existing dry side on the plate within a wet channel 16. This plate uniformity also serves to reduce the manufacturing cost of this apparatus.

Figure 12:
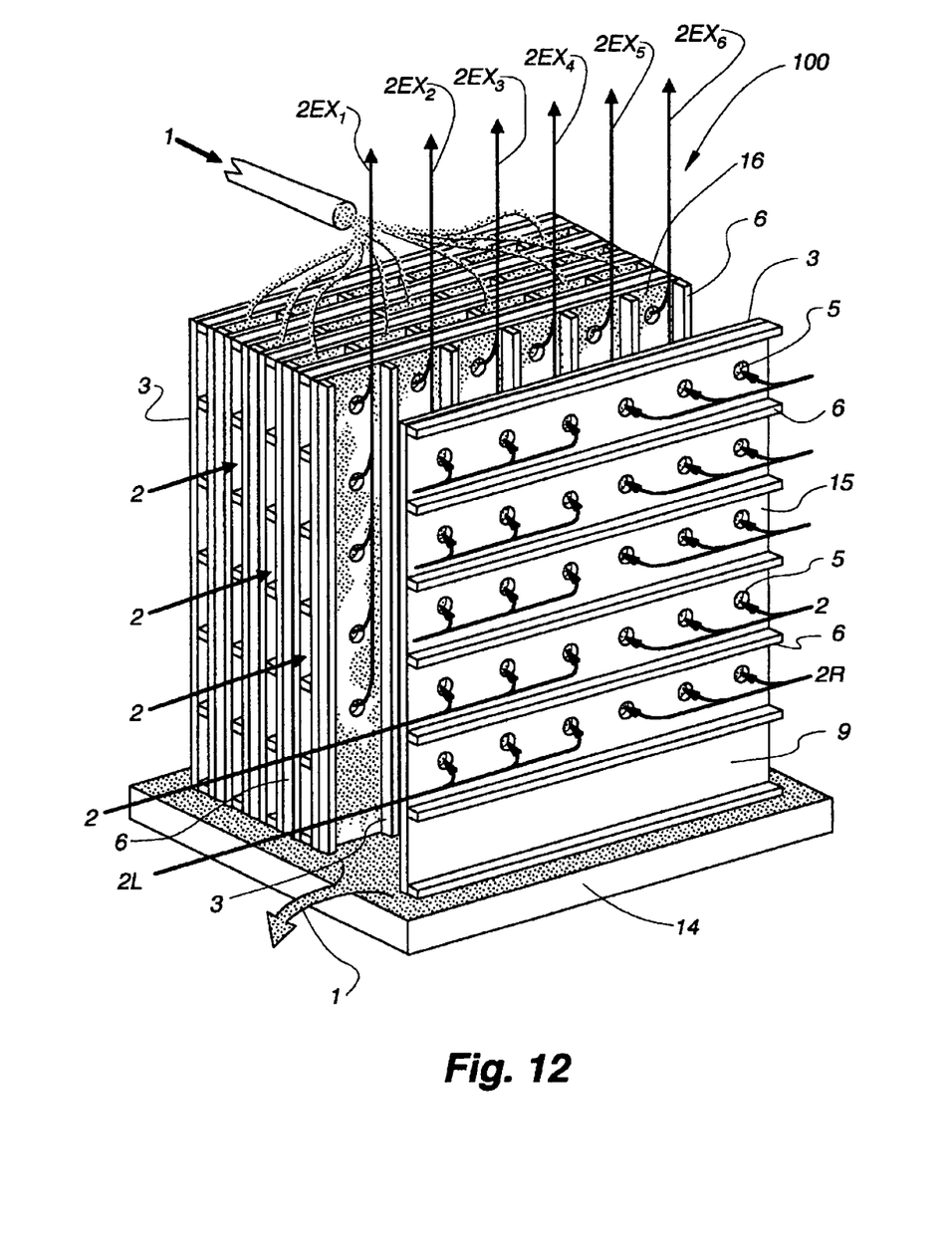
FIG. 12 is a perspective view of certain alternative gas flow paths through an array of hole-containing plates.

FIG. 12 shows another embodiment of the present invention wherein incoming air 2 enters from both the left side and the right side of the indirect evaporative cooling apparatus, through its dry channels 15. The respective streams of air (e.g., streams 2(L) and 2(R)) flow inwardly and pass inward through a respective array of holes 5 in each plate 3. A porous, absorbent material 9 can be provided on the opposite side of such plates within the wet channels 16. The coolant liquid 1 can be distributed evenly over the top surfaces of the wet channels 16 so that, by gravity, the coolant liquid 1 passes downward through a porous material layer 9 attached to the wet side of the plates 3. Baffles or spacers 6 can be provided within the wet channels 16 to guide the exhaust gas sub-streams $2EX_1$, $2EX_2$ ... $2EX_6$ as they leave the apparatus. In this embodiment, the exhaust gas is shown being directed upwardly in a counter-flow direction to the downward flow of the incoming coolant liquid 1.

Figure 13:
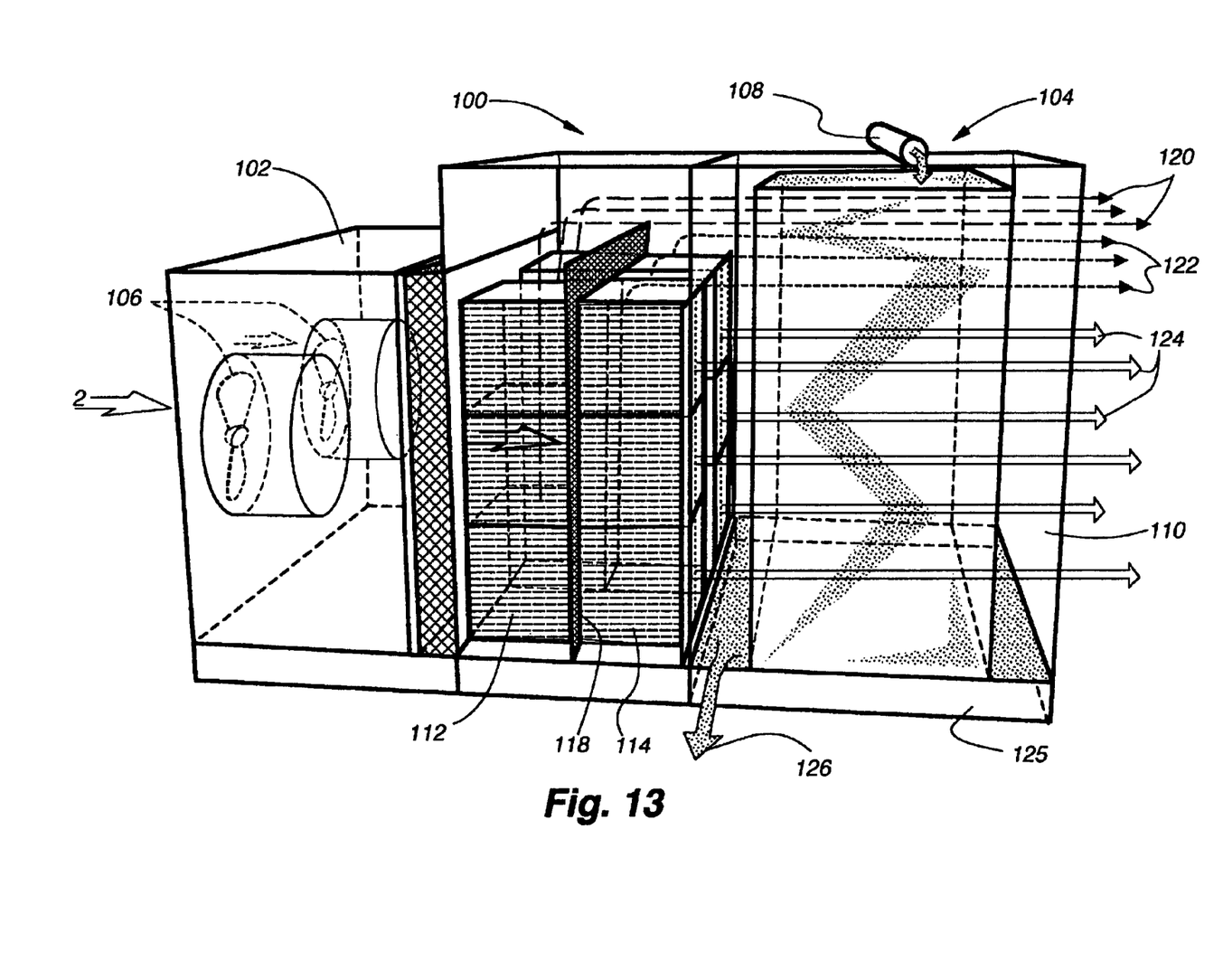
FIG. 13 is a transparent view of a cooling tower provided with an indirect evaporative cooling device made, and used, according to the teachings of this patent disclosure. The flows from the evaporative cooler core can be selectively directed to desired segments of an apparatus such as a cooling tower.

FIG. 13 depicts applicants' indirect evaporative cooling apparatus 100 being used as a component of a more complex apparatus comprising a fan system 106, applicants' cooling apparatus 100 and a water cooling tower 104. Applicants' cooling apparatus 100 takes ambient air 2 delivered by the fan system 106, cools that air 2 and then delivers it (e.g., in one or more streams such as the three separate streams 120, 122 and 124 depicted in FIG. 13) to the water cooling tower 104. The top of the water cooling tower 104 is shown receiving a stream of water 108 in need of cooling.

The cooling apparatus 100 is depicted as having two cooling regions 112 and 114. Cooling region 114 is not a separate and distinct region from region 112, but rather region 114 is merely an extension of region 112. That is to say that the two cooling regions are created by virtue of some of the incoming air 2 passing over a greater length of any given cooled plate (not otherwise shown in FIG. 13). The incoming air 2 is delivered to an array of dry side channel openings. This air 2 passes through the dry side channels in a direct flow direction (e.g., from left to right) over an initial portion of an array of heat exchange plates (e.g., such as the array shown in FIG. 8). A first portion of this air 2 flows through a first group of holes in the heat exchange plates and then is directed in an upwardly directed, cross-current flow direction. This first portion of air is shown leaving the first region 112 and passing over a baffle plate 118 that is attached to the outside of the cooling apparatus 100. The portion of air passing over the top of the baffle plate is shown flowing rightwardly through a top region of the water cooling tower 104. It is generally designated as sub-streams 120. These sub-streams 120 are relatively warm and relatively humid air.

A second portion of the rightwardly flowing air 2 passes over an extended portion of the same array of heat exchange plates. Consequently, this second portion of the rightwardly moving air is in longer contact with the cooled plates. Hence, this second portion of air becomes relatively cooler than the first portion of air removed from region 112. The second portion of air flows through a second group of holes in the plates that are further downstream from the first group of holes through which the first portion of air passed. The second portion of air leaving region 114 is also directed in an upwardly direction, cross-current flow direction. This second portion of air is shown leaving the second region 114 and then flowing rightwardly through a middle level of the water cooling tower 104. This second portion of air is generally lower than the first portion of air and is generally designated as sub-streams 122. These sub-streams 122 are relatively cooler than sub-streams 120. They also may be relatively more humid.

A third portion of the air 2 entering the cooling apparatus lob is shown passing directly through the dry side channels (i.e., without passing through holes in the plates and without being directed in an upward cross-current flow direction). This third portion of air is shown leaving the second region 114 and flowing through a lower level of the cooling tower 104. This third portion of air is generally designated as sub-streams 124. These sub-streams 124 are relatively cooler than sub-streams 122. These sub-streams 124 will however be relatively dryer than sub-streams 122 and 120. Thus, a stream of water 108 entering the top of the water cooling tower 104 will be progressively cooled as it descends down said tower to a reservoir 125 from which a stream 126 of cooled water can be removed.

The embodiments, described in the specifications and drawings of this patent disclosure are illustrative of the present invention, but are not intended to limit the scope thereof. It also is to be understood that this invention can be applied to a wide variety of cooling devices e.g., cooling towers, industrial heat exchangers, air conditioning apparatus, etc. It also should be appreciated that the indirect cooling devices described herein can be expanded to any desired size to accommodate the cooling duties of a given cooling operation. Therefore, changes in the processes disclosed herein, as well as changes in the details of construction of various physical components thereof, may be made without departing from the spirit of this invention.

What is claimed is:

1. A process for indirect evaporative cooling of a liquid desiccant product comprising the steps of:
   a) placing a gas stream entering the process in contact with a cooled plate that separates the gas stream entering the process from the liquid product that will exit said process;
   b) forcing a portion of the gas stream entering the process through holes in the plate, wherein a portion of the liquid product evaporates into the gas forced through the holes, cooling the liquid product: and
   c) removing the resulting cooled liquid product.

2. The process of claim 1 wherein the portion of the gas stream that is forced through the holes in the plate is from about 5% to 100% of the fluid entering the process.

3. The process of claim 1 wherein the gas stream that is forced through the holes in the plate then flows in a cross-current direction relative to a direction of the fluid stream entering the process.

4. The process of claim 1 wherein the gas stream that is forced through the holes in the plate then flows in a counter-current direction relative to a direction of the fluid stream entering the process.

5. The process of claim 1 wherein a plurality of hole-containing plates are employed.

6. The process of claim 1 wherein the plate is a hole-containing, corrugated plate that defines a plurality of channels through which a plurality of respective gas and liquid streams flow.

7. The process of claim 1 wherein the plate has an outside surface that is not flat.

8. The process of claim 1 wherein the gas stream entering the process has a higher pressure than the gas stream that exits the process.

9. The process of claim 1 wherein the gas stream is a stream of air.

10. The process of claim 1 wherein the gas stream entering the process is exposed to a desiccant.

11. The process of claim 1 wherein the gas stream entering the process is exposed to a dry desiccant.

12. The process of claim 1 wherein the gas stream entering the process is exposed to a liquid desiccant.

13. The process of claim 1 wherein a portion of the gas stream is heated.

14. The process of claim 1 wherein the liquid is heated.

15. The process of claim 1 wherein the plate is further provided with a layer of porous material capable of allowing flow of the liquid therein.

16. A process for indirect evaporative cooling of a liquid desiccant product comprising the steps of:
  a) providing an indirect evaporative cooling apparatus having a dry side channel and a wet side channel separated by a plate having holes that permit fluid communication between the dry side channel and the wet side channel;
  b) introducing the liquid product into the wet side channel;
  c) introducing a gas into the dry side channel in a manner such that a portion of the gas is pre-cooled and passed through the holes in the plate wherein a portion of the liquid product evaporates into the gas forced through the holes, cooling the liquid product;
  d) removing a resulting gas/evaporative liquid vapor combination from the wet side channel; and
  e) removing a resulting cooled liquid product from the wet aide channel.

17. The process of claim 16 wherein the portion of pre-cooled gas that passes through the holes in the plate is from about 5% to 100% (by volume) of the gas introduced into the dry side channel.

18. The process of claim 16 wherein the portion of pre-cooled gas that passes through the holes in the plate then flows in a cross-current direction in the wet side channel.

19. The process of claim 16 wherein the portion of gas that passes through the holes in the plate then flows in a counter-current direction in the wet side channel.

20. The process of claim 16 wherein a plurality of plates define a plurality of dry side channels and a plurality of wet side channels.

21. The process of claim 16 wherein the plate is a hole-containing corrugated plate that defines a plurality of channels through which a plurality of respective gas streams flow.

22. The process of claim 16 wherein the evaporative cooling process employs a series of corrugated plates having alternating orientations and define (1) a plurality of dry side channels that cause fluid flow in an incoming fluid flow direction and (2) a plurality of wet side channels that cause fluid flow in a cross-current direction relative to the incoming fluid flow direction.

23. The process of claim 16 wherein the gas is air.

24. The process of claim 16 wherein the gas exposed to a desiccant in the dry side channel.

25. The process of claim 16 wherein the gas is exposed to a dry desiccant in the dry side channel.

26. The process of claim 16 wherein the gas is exposed to a liquid desiccant in the dry side channel.

27. The process of claim 16 wherein the gas is exposed to a liquid desiccant in the dry side channel and wherein that liquid desiccant is transferred to the wet side channel where it is used as a component of an evaporative liquid.

28. The process of claim 16 wherein the gas is heated.

29. The process of claim 16 wherein the evaporative liquid is heated.

30. The process of claim 16 wherein the plate is further provided with a layer of porous material capable of allowing flow of the liquid product therein.

31. The process of claim 16 wherein the resulting gas/evaporative liquid vapor system is removed from the wet side channel in two or more streams that have different temperatures.

32. The process of claim 16 wherein the resulting gas/evaporative liquid vapor combination is removed from the wet side channel in (a) two or more relatively humid streams that have different, relatively higher temperatures and are directed to an upper region of a cooling tower and (b) at least one relatively cooler, less humid stream that is directed to a lower region of the cooling tower.

33. A process for indirect evaporative cooling of a water product comprising the steps of:
  a) providing an indirect evaporative cooling device having a dry side channel that defines a first air flow direction and a wet side channel that defines a second air flow direction that is cross-current to the first air flow direction and wherein the dry side channel and the wet side channel are separated by a plate having holes that permit fluid communication between the dry side channel and wet side channel;
  b) introducing air into the dry side channel at a pressure such that a portion of the air passes through the holes in the plate;
  c) providing the dry side channel with a desiccant;
  d) providing a wet side channel portion of the plate with a film of water, a portion of which is capable of evaporating into the air under the temperature and pressure conditions existing in the wet side channel;
  e) removing a resulting gas/liquid vapor stream from the wet side channel; and
  f) removing a resulting cooled water product from the wet side channel.

34. The process of claim 33 wherein the desiccant is a solid desiccant.

35. The process of claim 33 wherein the desiccant is a liquid desiccant.

36. The process of claim 33 wherein the portion of air that passes through the holes in the plate is from about 5% to 100% (by volume) of the air introduced into the dry channel.

37. The process of claim 33 wherein the air is exposed to a liquid desiccant in the dry side channel and wherein that liquid desiccant is then transferred to the wet side channel where it is used as a component of liquid product.

38. The process of claim 33 wherein the portion of the air that passes through the holes in the plate is from about 20% to about 100% (by volume) of the air introduced into the dry channel and wherein the remainder of said air passes around the plate and into the wet side channel.

39. The process of claim 33 wherein the air is heated.

40. The process of claim 33 wherein the water is heated.

41. The process of claim 33 wherein the plate is further provided with a layer of porous material capable of allowing flow of the liquid product therein.

42. The process of claim 33 wherein the resulting gas/evaporative liquid vapor system is removed from the wet side channel in two or more streams that have different temperatures.

43. Apparatus for cooling a liquid product via indirect evaporative cooling utilizing evaporative liquid and working gas, the apparatus comprising:

a plurality of parallel, spaced apart plates each having two surfaces, wherein (a) the first surface of each plate forms at least partially a dry side, over which the working gas flows, (b) the first surface further forms perforations to permit the working gas from the dry side to flow onto the second surface, (c) the second surface of each plate forms at least partially a wet side, wherein the wet side is wetted with evaporative fluid which cools the wet side as it evaporates, (d) each second surface further forms a wet side channel for the liquid to be cooled, (e) opposing surfaces of adjacent plates have like sides, and (f) the plates are oriented generally vertically in order to allow the liquid product to flow; and means for causing the working air to flow over the dry side, through the perforation, and then over the wet side; means for providing the liquid product to the wet side channel; and means for providing the cooled liquid product from the wet side channel to a user.

44. The apparatus of claim 43 wherein a portion of the liquid product comprises the evaporative liquid.

45. The apparatus of claim 43 wherein approximately 5% to 100% of the working gas, by volume, passes from the dry side of a plate to the wet side via the perforations.

46. The apparatus of claim 43 wherein each plate is corrugated, forming corrugation channels for the working gas.

47. The apparatus of claim 43 wherein each plate further forms working gas channels on the wet side and the dry side to guide the working gas.

48. The apparatus of claim 47 wherein the working gas channels on the wet sides are generally transverse to the working gas channels on the dry sides.

49. The apparatus of claim 43 wherein the working gas is air.

50. The apparatus of claim 43 wherein thin product liquid is water.

* * * * *

UNITED STATES PATENT AND TRADEMARK OFFICE
CERTIFICATE OF CORRECTION

PATENT NO. : 6,854,278 B2 Page 1 of 1
APPLICATION NO. : 10/223223
DATED : February 15, 2005
INVENTOR(S) : Maisotsenko et al.

It is certified that error appears in the above-identified patent and that said Letters Patent is hereby corrected as shown below:

Column 12, Line 13, delete "lob" and insert --100--

Column 12, Line 53, delete "fluid" and insert --gas--

Column 12, Line 56, delete "fluid" and insert --gas--

Column 12, Line 60, delete "fluid" and insert --gas--

Column 13, line 16, between "the liquid" and "is heated" insert --product--

Column 13, line 19, after "the liquid" insert --product--

Column 13, line 38, delete "aide" and insert --side--

Column 14, line 6, delete "an evaporative liquid." and insert --the liquid product.--

Column 14, line 14, delete "system" and insert --combination--

Column 14, line 41, between "into the air" and "under the temperature" insert --passed through the holes--

Column 15, line 2, delete "system" and insert --combination--

Column 15, line 26, delete "perforation," and insert --perforations,--.

Signed and Sealed this

Seventeenth Day of April, 2007

JON W. DUDAS
*Director of the United States Patent and Trademark Office*